(12) United States Patent
Curtis et al.

(10) Patent No.: US 6,903,999 B2
(45) Date of Patent: Jun. 7, 2005

(54) SYSTEM AND METHOD FOR ESTIMATING SEISMIC MATERIAL PROPERTIES

(75) Inventors: Andrew Curtis, Edinburgh (GB); Johan Olof Anders Robertsson, Oslo (NO); Remco Muijs, Zurich (CH)

(73) Assignee: Schlumberger Technology Corporation, Ridgefield, CT (US)

( * ) Notice: Subject to any disclaimer, the term of this patent is extended or adjusted under 35 U.S.C. 154(b) by 267 days.

(21) Appl. No.: 10/181,234

(22) PCT Filed: Jan. 19, 2001

(86) PCT No.: PCT/GB01/00182

§ 371 (c)(1),
(2), (4) Date: Oct. 16, 2002

(87) PCT Pub. No.: WO01/53853

PCT Pub. Date: Jul. 26, 2001

(65) Prior Publication Data

US 2003/0117894 A1 Jun. 26, 2003

(30) Foreign Application Priority Data

Jan. 21, 2000 (GB) .............................................. 0001355
Feb. 15, 2000 (GB) .............................................. 0003410

(51) Int. Cl.[7] .............................. G01V 1/30; G01V 1/32
(52) U.S. Cl. .............................. 367/38; 367/21; 367/58; 367/702; 367/11
(58) Field of Search .............................. 367/21, 25, 38, 367/54, 58, 59, 60, 73; 702/6, 11, 14

(56) References Cited

U.S. PATENT DOCUMENTS 4,611,312 A * 9/1986 Ikeda ............................ 367/38
5,214,613 A * 5/1993 Esmersoy ...................... 702/11
5,588,032 A * 12/1996 Johnson et al. ................. 702/1

OTHER PUBLICATIONS

Curtis et al., "Volumetric wavefield recording and wave equation inversionfor near–surface material properties", Geophysics (USA), vol. 67, No. 5., pp. 1602–1611, Sep. 2002.*

Yi et al., "Wave equation inversion of skeletalized geophysical data", Geophysical–Journal–International(UK), vol. 105, No. 2., p 289–294, May 1991, ISSN: 0956–540X.*

* cited by examiner

Primary Examiner—Ian J. Lobo
(74) Attorney, Agent, or Firm—William L. Wang; William B. Batzer; John J. Ryberg

(57) ABSTRACT

A method for estimating near-surface material properties in the vicinity of a locally dense group of seismic receivers is disclosed. The method includes receiving seismic data that has been measured by a locally dense group of seismic receivers. Local derivatives of the wavefield are estimated such that the derivatives are centered at a single location preferably using the Lax-Wendroff correction. Physical relationships between the estimated derivatives including the free surface condition and wave equations are used to estimate near-surface material properties in the vicinity of the receiver group. Another embodiment of the invention is disclosed wherein the physical relationships used to estimate material properties are derived from the physics of plane waves arriving at the receiver group, and the group of receivers does not include any buried receivers.

19 Claims, 8 Drawing Sheets

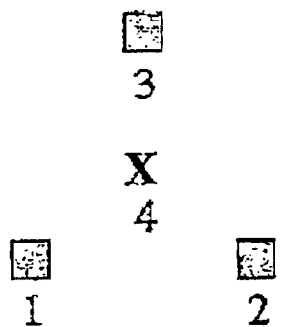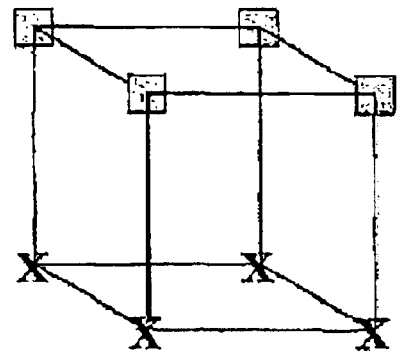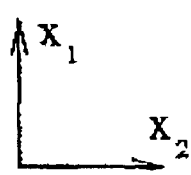
Figures 2(a)-2(d)

SYSTEM AND METHOD FOR ESTIMATING SEISMIC MATERIAL PROPERTIES

FIELD OF THE INVENTION

The present invention relates to the field of determining characteristics of the land seismic wavefield. In particular, the invention relates to a system and method of processing seismic data from locally dense groups of receivers to estimate seismic material properties close to the receivers.

BACKGROUND OF THE INVENTION

Previous studies have developed and tested methods to invert aspects of seismic data for elastic properties of Earth structure that are located either close to, or far from the seismic data receivers. When the data inverted are the actual seismic waveforms recorded, this process is called waveform inversion. These techniques compare seismic waveforms generated for a synthetic Earth model with those recorded; the model is then updated in such a way that the misfit between the two sets of waveforms is reduced. Hence, up to now waveform inversion studies have solved the wave equation in an Earth model to predict and then fit the particular waveforms that were recorded, where the predicted waveforms are derived from the wave equation solution. Such techniques include ground roll inversion and diving wave tomography. However, these techniques suffer from at least one of the following shortcomings: non-uniqueness of solution, sensitivity to noise, and unpractical source receiver configurations.

SUMMARY OF THE INVENTION

Thus, it is an object of the present invention to provide a method of processing seismic data from locally dense groups of receivers to estimate seismic material properties close to the receivers.

According to the invention, a method of estimating near-surface material properties in the vicinity of a locally dense group of seismic receivers is provided. The method includes receiving seismic data that has been measured by a locally dense group of seismic receivers, and the data representing earth motion caused by the seismic wavefield. Local derivatives of the wavefield are estimated such that the derivatives are centered at a single location in the vicinity of the receiver group. Physical relationships between the estimated derivatives are used to estimate near-surface material properties in the vicinity of the receiver group.

According to a preferred embodiment of the invention, the derivatives are centered using a technique substantially similar to the Lax-Wendroff correction, and the physical relationships used to estimate material properties include the free surface condition. Also according to a preferred embodiment, the physical relationships used to estimate material properties include wave equations, and at least one of the receivers in the receiver group is buried below the earth surface such that the receiver group encloses a volume.

According to an embodiment of the invention, the receivers in the locally dense group are spaced apart by around 1 meter or less, or according to another embodiment, by about one-fifth of the shortest wavelength of interest or less.

According to another embodiment of the invention, the receivers are located at or near the sea bottom, and the physical relationships used to estimate material properties include fluid-solid boundary conditions.

According to another preferred embodiment of the invention, the physical relationships used to estimate material properties are derived from the physics of plane waves arriving at the receiver group, and the group of receivers does not include any buried receivers.

The invention is also embodied in an apparatus for estimating near-surface material properties in the vicinity of a locally dense group of seismic receivers.

BRIEF DESCRIPTION OF THE DRAWINGS

FIGS. 2a–d illustrate various geometries for the receiver groups, according to the invention;

DETAILED DESCRIPTION OF THE INVENTION

Figure 1:
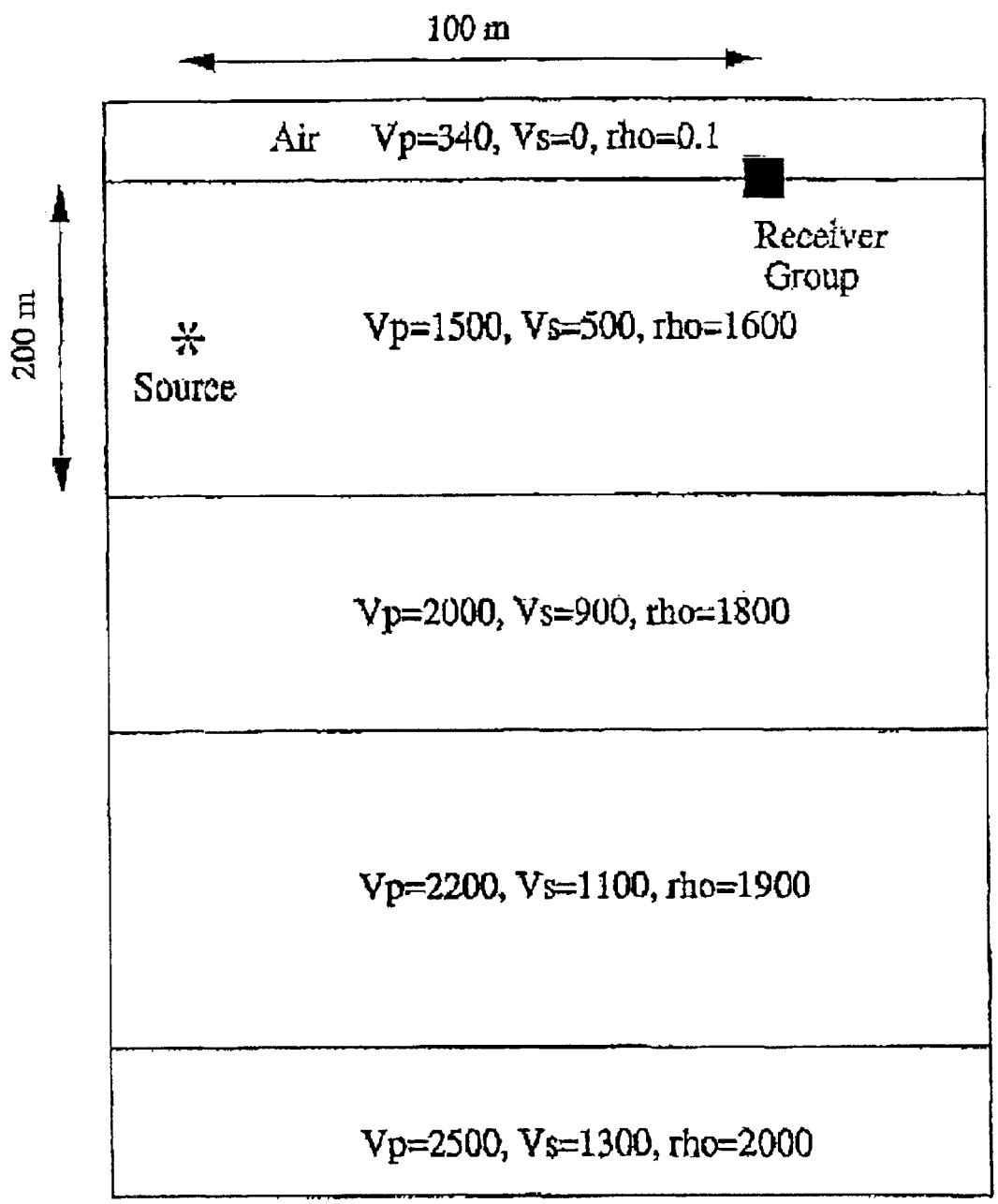
FIG. 1 shows an isotropic Earth model used in the description of the invention.

Volumetric recording of the wavefield can be used to calculate and to invert spatial wavefield derivatives for P and S velocities in the Earth in the neighbourhood of a small, closely-spaced array of receivers. "Volumetric recording" refers to the fact that the array approximately encloses a volume of the Earth. This allows spatial derivatives of the wavefield in all directions to be calculated. The quantities estimated are the effective velocities of the P and S components of the wavefield at any point in time. Hence, these will vary with both wave type and wavelength. If estimated for the near surface Earth structure, such velocities may be useful for statics estimation, or for separation of the wavefield into up- and down-going components. For further detail on separation of the wavefield see UK Patent Application GB 2 333 364 A (published Jul. 21, 1999), and UK Patent Application entitled "System and Method for Seismic Wavefield Separation" (UK Patent Application No. 0003406.6), filed on Feb. 15, 2000, both of which are incorporated herein by reference.

According to the invention, several inversion methods are provided. According to one method, referred to herein as "full wave equation inversions", all wavefield derivatives that feature in the wave equation are measured explicitly so that the full wave equation can be inverted. This method can be applied anywhere within the Earth, but derivative measurement may be difficult logistically if the properties are required at depth beneath the surface of the Earth. According to the invention, the logistics may be simplified greatly if velocities are required in the near surface. This simplification involves a transformation of the wave equation and introduces corrections, preferably analogous to the Lax-Wendroff corrections used in synthetic finite-difference techniques, to the wavefield processing and inversion methodology.

According to another embodiment of the invention, another inversion method is provided that is particularly applicable when estimating velocities close to the land surface. This method involves using the free surface conditions on the wavefield to calculated first order vertical derivatives of the wavefield that are consistent with the first order horizontal derivatives. These are then equated with measured vertical derivatives giving a set of linear equations for P and S velocity (one equation from each point in time) These can be solved numerically as a function of time and frequency.

To characterise sub-land reservoirs it is often necessary to analyse seismic data recorded on the land surface. Such data is contaminated with various forms of noise that must be removed before a correct analysis can be carried out. Noise types specific to land-recording are derived from two main factors: first, static variations in the data from receiver group to receiver group can be very large due to changes in sub-receiver group velocities and to variations in base topography of the uppermost weathered layer of the earth. Second, the land surface is exactly the point at which the up-going wavefield (including the signal from the reservoir) is reflecting and converting into a down-going wavefield. Data recorded at the earth's surface contains both up- and down-going wavefields; the up-going wavefield must therefore be isolated in order to analyse the nature and true amplitudes of the signal coming up from the reservoir. This isolation is possible using techniques described in UK Patent Application entitled "System and Method for Seismic Wavefield Separation" (UK Patent Application No. 0003406.6), filed on Feb. 15, 2000, but ordinarily requires sub-receiver group P and S velocities to be known. Hence, both types of noise can be attenuated if we are able to estimate sub-receiver group P and S velocities.

Previous studies have developed and tested methods to invert aspects of seismic data for elastic properties of Earth structure that are located either close to, or far from the seismic data receivers. When the data inverted are the actual seismic waveforms recorded, this process is referred to as waveform inversion. These techniques compare seismic waveforms generated for a synthetic Earth model with those recorded; the model is then updated in such a way that the misfit between the two sets of waveforms is reduced. Hence, conventional waveform inversion techniques have solved the wave equation in an Earth model to predict and then fit the particular waveforms that were recorded, where the predicted waveforms are derived from the wave equation solution.

By contrast, according to the present invention, a method is provided that allows one to invert the complete wave equation for Earth properties rather than inverting any derived waveform quantity. The elastic, isotropic wave equation for particle displacement u (actually three dependent equations) can be written as:

$$\rho \ddot{u} = f + (\lambda + 2\mu)\nabla(\nabla \cdot u) - \mu \nabla \times (\nabla \times u), \quad (1)$$

where $\rho$ is the density, $\lambda$ and $\mu$ are Lamé's constants, f denotes the distribution of body forces and $\nabla = [\partial_1, \partial_2, \partial_3]^T$ where $\partial_i$ is the derivative operator with respect to coordinate direction $x_i$. Full wave equation inversion involves measuring all derivatives of the wavefield included in equation (1); once these and the body forces are known, equation (1) comprises a set of linear equations that may be solved for P and S velocity $\alpha$ and $\beta$ respectively where, $$\alpha = \sqrt{\frac{\lambda + 2\mu}{\rho}}, \quad \beta = \sqrt{\frac{\mu}{\rho}}. \quad (2)$$

When full wave equation inversion is performed at the Earth's surface (e.g., for land seismics), estimates of third order horizontal derivatives of the wavefield are ordinarily required. According to a preferred embodiment of the invention, another inversion method provides for the construction of a set of linear equations in $\alpha$ and $\beta$ specifically for use in land seismics using only second order derivative estimates.

The particular values of $\alpha$ and $\beta$ that are recovered using either method are those which control the propagation of waves past the receivers. Hence, these are effective P and S velocities averaged over a wavelength or so from the receivers, and may depend on both frequency and wavetype.

Wave equation inversion is particularly suited to new acquisition geometries involving receiver arrays that allow spatial and temporal derivatives of the wavefield to be recorded explicitly. For example, refer to UK Patent Application No. 9921816.6, filed Sep. 15, 1999, incorporated herein by reference. From studying the stability of such recording methods under perturbations in receiver locations, it is believed that whereas estimates of divergence and curl of the wavefield from volumetric recordings are relatively robust under perturbations in element location or amplitude, they are more sensitive to perturbations in the orientation of the individual recording sensors. Techniques based on these (and simpler) recording geometries can be used for separation of P and S waves and of upgoing and downgoing wavefields when recordings are made on, or close to, the ground surface. If temporally distinct P wave arrivals can be distinguished on signals recorded in such a configuration at the Earth's surface then estimates of material properties close to the receivers can be obtained using (assumed) plane wave approximations of the incoming field.

According to the present invention, these acquisition techniques can be adapted so that all wavefield derivatives pertinent to the wave equation, and hence to wave propagation local to the array, can be estimated. Using either preferred embodiment, these derivatives can be inverted to constrain effective material properties close to the receivers using recorded energy from any wave types, whether arrivals are temporally distinct or contemporaneous. These effective material properties are exactly those that can be used for separation of up- and down-going components of the wavefield.

At various stages herein exemplary results using synthetic data will be presented. The data was generated using a plane-layered reflectivity code. See e.g., Kennett, B. L., 1983, Seismic wave propagation in stratified media: Cambridge University Press, Cambridge. The reflectivity code used works to an internal precision of 4 significant figures. FIG. 1 shows an isotropic Earth model used in the description of the invention. A Ricker wavelet with 50 Hz central frequency was injected at the source location.

FIG. 2 illustrates various geometries for the receiver groups, according to the invention. As the name suggests, volumetric wavefield recording involves recording aspects of the wavefield at points that approximately enclose a volume in the Earth. FIG. 2(a) shows a geometry that approximately encloses a four point tetrahedral volume defined using the receiver locations as vertices. It has been shown that this geometry was sufficient to estimate the average divergence and curl of the wavefield within the tetrahedron, thus performing approximate separation of P and S energy (respectively divergence and curl of the wavefield). See, Johan O. A. Robertsson and Everhard Muyzert. Wavefield separation using a volume distribution of three component recordings. *Geophys. Res. Lett.,* 26(18): 2821–2824, 1999, incorporated herein by reference.

Using the geometry shown in FIG. 2(*a*), all first order spatial derivatives of the wavefield can be calculated simply by taking finite differences (hereinafter "fd's") between different components. For example, if the particle velocity $v^{(i)}$ is recorded at receiver i, and receivers 1, 2 and 3 in FIG. 2(*a*) are located on the corners of an equilateral triangle with centroid vertically above receiver 4, then $$\partial_3 v \simeq \frac{v^{(4)} - [(v^{(1)} + v^{(2)} + v^{(3)})/3]}{\Delta x_3} \quad (3)$$

where Cartesian coordinate directions are $x_1$, $x_2$ and $x_3$ with $x_3$ vertically downwards, where in our notation $\partial_3 v$ represents $\partial v/\partial x_3$, and where $\Delta x_3$ is the depth of receiver 4. Other derivatives may be approximated using different fd stencils.

Considering the aim to invert simultaneously various different wavefield derivatives for material properties using the wave equation, one disadvantage of this geometry is immediately apparent. The depth derivative estimate in equation (3) is centered vertically above receiver 4 at depth $dx_3/2$ whereas estimates of both $\partial_1 v$ and $\partial_2 v$ will use fd stencils involving only receivers 1–3 and hence will be centered on the surface. The wave equation (1) relates derivatives at identical locations, and although this deviation in centering may seem small, it can be very significant as illustrated below. To obtain derivative estimates that are all centered at exactly the same location, at least two options are available: first, geophones might be planted in a more symmetric geometry. For example, equi-centered fd stencils for first-order spatial derivatives can easily be constructed using the geometry shown in FIG. 2(*b*). However, if such geometries are too labour intensive or are simply impractical to plant, a method that corrects the first-order derivative centering using higher-order derivatives as discussed in further detail below.

To invert equation (1) for P and S velocity it is necessary to estimate second order spatial and temporal wavefield derivatives centered at identical locations. Computationally, the simplest way that this can be achieved is to plant a receiver configuration similar to that in FIG. 2(*b*) but this time using a 3×3 array of receivers. Fd stencils similar as those discussed in further detail below can then be used to estimate second derivatives.

In certain situations geometries using fewer receivers can be used (See, eg., FIGS. 2(*c*) and 2(*d*)), but similarly to the first-order case above, it identically centered derivatives are to be measured then centering corrections should be made. For the most part in this description, the simplified geometries are used in land seismic surveys where the free surface boundary condition allows certain derivatives to be calculated implicitly. However, according to the invention, similar geometries can be applied in the ocean bottom or borehole seismics cases, where the fluid-solid boundary plus a pressure sensor allow the same derivatives to he calculated implicitly.

A principal feature of the invention is that the receivers within each group used to calculate wavefield derivatives are spaced apart by around one-fifth to one-tenth of the relevant wavelenth. Advantages of moving to smaller inter-receiver spacings include increased accuracy in the estimated derivatives, and greater validity in the assumption that the material properties are the same in the vicinity of the receivers. However, an advantage of wider spacing is less sensitivity to noise. These competing concerns in combination with the wavelength of interest (or more accurately, the projection of the wavefield on the recording surface), should be taken into consideration when designing the receiver group spacing. According to a presently preferred embodiment, the locally dense receivers are spaced about 1 meter apart. However spacing can in some situations be larger, for e.g. around 2 meters, or smaller, e.g. 0.5 meters. According to a preferred embodiment the inter-receiver spacing is around 0.25 meters or less. As mentioned, the optimal spacing of the receivers depends upon the wavelength of interest. There should be at least two receivers within the projection of the shortest wavelength of interest on the recording surface. According to a preferred embodiment the receivers are spaced apart by a distance approximately equal to or less than one-fifth of the shortest wavelength of interest.

Figure 3:
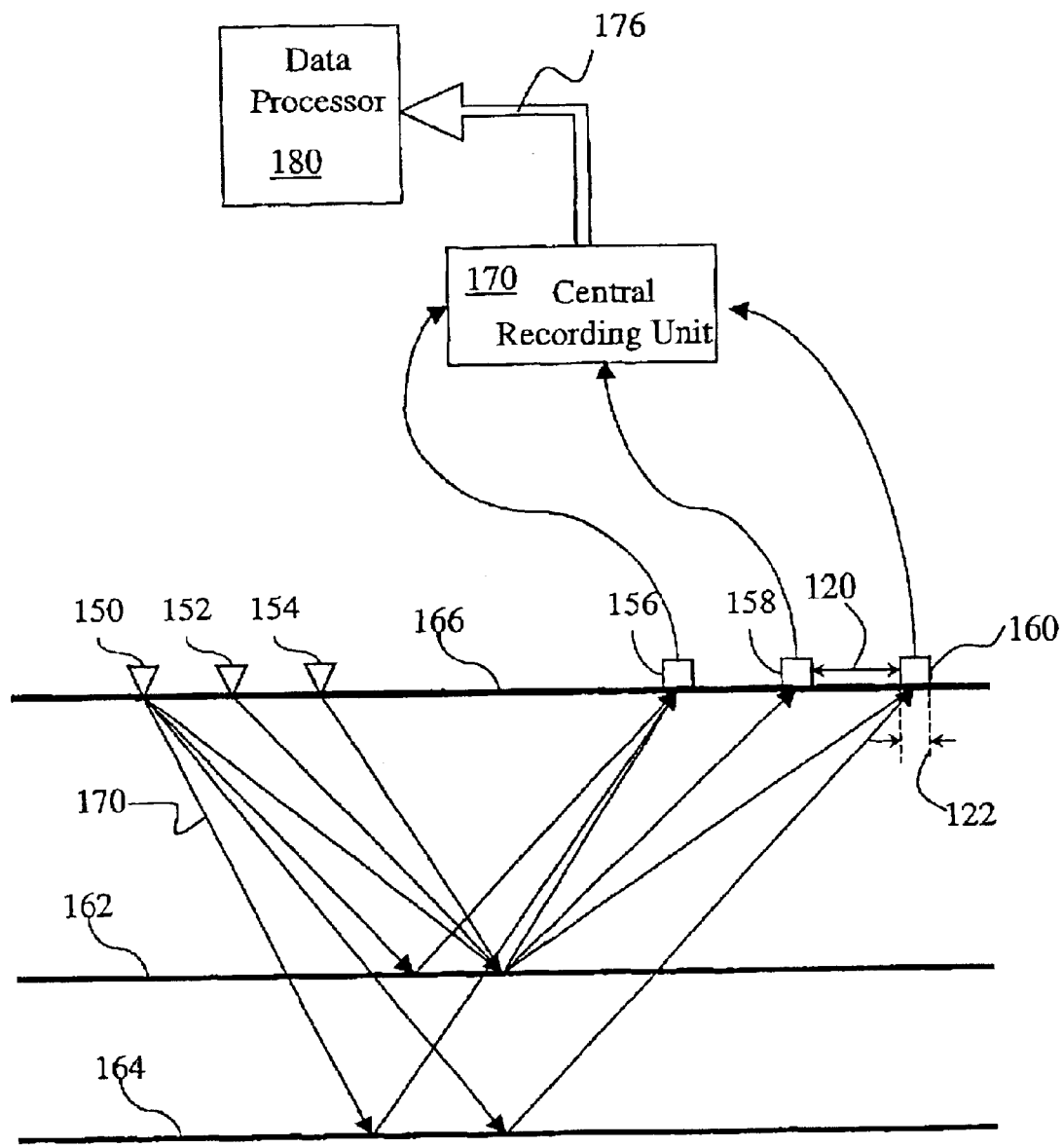
FIG. 3 is a schematic illustration of a seismic data acquisition and processing system, according a preferred embodiment of the invention.

FIG. 3 is a schematic illustration of a seismic data acquisition and processing system, according a preferred embodiment of the invention. Seismic sources 150, 152, and 154 are depicted which impart vibrations into the earth at its surface 166. The vibrations imparted onto the surface 166 travel through the earth; this is schematically depicted in FIG. 3 as arrows 170. The vibrations reflect off of certain subterranean surfaces, here depicted as surface 162 and surface 164, and eventually reach and are detected by receiver groups 156, 158, and 160. Each receiver group comprises a number of receivers such as in the arrangements depicted in FIGS. 2*a*–*d*.

Importantly, according to the preferred embodiment, the spacing of between the receivers within a single receiver group is substantially less than the spacing between the receiver groups. Schematically, this is shown in FIG. 3 by the size 122 of receiver group 160 is substantially smaller than the distance 120 between group 160 and an adjacent group 158.

Each of the receivers in groups 156, 158, and 160 convert the vibrations into electrical signals and transmit these signals to a central recording unit 170, usually located at the local field site. Preferably, the data is not group formed, but data from each geophone component are recorded. The central recording unit typically has data processing capability such that it can perform a cross-correlation with the source signal thereby producing a signal having the recorded vibrations compressed into relatively narrow wavelets or pulses. In addition, central recording units may provide other processing which may be desirable for a particular application. Once the central processing unit 170 performs the correlation and other desired processing, it typically stores the data in the form of time-domain traces on a magnetic tape. The data, in the form of magnetic tape is later sent for processing and analysis to a seismic data processing center, typically located in some other geographical location. The data transfer from the central recording unit 170 in FIG. 3 is depicted as arrow 176 to a data processor 180.

Referring again to FIGS. 2*a*–*d,* receiver geometries similar to those in FIGS. 2(*a*) and 2(*b*) have the advantage that they may be planted at any orientation, and at any depth in the Earth, and will still provide the same derivative information. However, a disadvantage when deployed below the surface is that several receivers must be buried within the Earth (especially limiting if a 3×3×3 cubic geometry is used for second-order derivative estimation). According to the invention, simpler receiver geometries can be used to obtain the same information when deployed at the Earth's surface.

The elastic constitutive relation relates components of the stress tensor $\sigma_{ij}$ in a source free region to the strain tensor components $\epsilon_{ij}$ $$\sigma_{ij} = C_{ijkl} \epsilon_{kl}, \quad (4)$$

where $c_{ijkl}$ are the elastic stiffnesses. Index values 1 and 2 correspond to horizontal coordinates $x_1$ and $x_2$ whereas index value 3 corresponds to the vertical direction downwards $x_3$. Using the Voigt notation, equation (1) can be written as:

$$\begin{pmatrix} \sigma_{11} \\ \sigma_{22} \\ \sigma_{33} \\ \sigma_{23} \\ \sigma_{13} \\ \sigma_{12} \end{pmatrix} = C \begin{pmatrix} \varepsilon_{11} \\ \varepsilon_{22} \\ \varepsilon_{33} \\ 2\varepsilon_{23} \\ 2\varepsilon_{13} \\ 2\varepsilon_{12} \end{pmatrix}, \quad (5)$$

where C is the symmetric stiffness matrix with 21 independent components. If we assume that material properties in the near-surface environment are isotropic, the stiffness matrix takes the following form:

$$C = \begin{pmatrix} \lambda+2\mu & \lambda & \lambda & 0 & 0 & 0 \\ \lambda & \lambda+2\mu & \lambda & 0 & 0 & 0 \\ \lambda & \lambda & \lambda+2\mu & 0 & 0 & 0 \\ 0 & 0 & 0 & \mu & 0 & 0 \\ 0 & 0 & 0 & 0 & \mu & 0 \\ 0 & 0 & 0 & 0 & 0 & \mu \end{pmatrix}, \quad (6)$$

where $\lambda$ and $\mu$ are the Lamé constants. Strain $\epsilon_{ij}$ is related to particle velocity $v_i$ through $$\partial_t \varepsilon_{ij} = \frac{1}{2}(\partial_j v_i + \partial_i v_j), \quad (7)$$

where $\partial_t$ denotes a time derivative. The free-surface conditions on the wavefield that must hold at the Earth's surface can be written:

$$\sigma_{i3} = 0, \quad i=1, \ldots, 3. \quad (8)$$

Equation (8) states that all components of the stress tensor acting across the (horizontal) free surface of the Earth vanish. Substituting equations (5), (6) and (7) into (8) provides three constraints on particle velocities at the free surface:

$$\partial_3 v_3 = -\left(\frac{\beta}{\alpha}\right)^2 (\partial_1 v_1 + \partial_2 v_2), \quad (9)$$

$$\partial_3 v_2 = -\partial_2 v_3, \quad (10)$$

$$\partial_3 v_1 = -\partial_1 v_3, \quad (11)$$

Thus the vertical wavefield derivatives can be expressed in terms of horizontal derivatives. Note that the material properties only occur in equation (9), not in equations (10) and (11).

In land acquisition, spatial distributions of 3C receivers at the surface allow for the computation of horizontal spatial derivatives of particle velocities (or time-derivatives thereof if particle acceleration is recorded, etc.). Advantageously, according to the invention, invoking the free surface conditions (equations (9)–(11)) enables the calculatation of first order vertical derivatives using the same configuration of 3C receivers at the surface, provided that the ratio between the P and S velocities is known.

In fact, if either of the receiver geometries in FIG. 2(c) or (d) is used, the free surface condition allows all second order derivatives of the wavefield to be estimated as shown in further detail below. Note that applying fd stencils to the geometry in FIG. 2(d) also allows all third order purely horizontal derivatives to be estimated.

According to the invention, the free surface conditions (equations (9)–(11)) can be used to rewrite the wave equation (1) into a different form that is valid at the free surface in an isotropic medium. Provided all of the derivative estimates are centered at the same point on the free surface, this equation can be inverted for near-surface material properties. The wave equation comprises the constitutive relation (4) and the equation of motion:

$$\partial_t v = \frac{1}{\rho} \nabla \cdot \sigma \quad (12)$$

$$= \frac{1}{\rho} \begin{bmatrix} \partial_1 \sigma_{11} + \partial_2 \sigma_{21} + \partial_3 \sigma_{31} \\ \partial_1 \sigma_{12} + \partial_2 \sigma_{22} + \partial_3 \sigma_{32} \\ \partial_1 \sigma_{13} + \partial_2 \sigma_{23} + \partial_3 \sigma_{33} \end{bmatrix}. \quad (13)$$

Let us define the following terms:

$$\nabla_H = [\partial_1 \partial_2]^T \quad (14)$$

$$v_H = [v_1 v_2]^T \quad (15)$$

The isotropic constitutive relation (4), the free surface conditions (9)–(11) and the equation of motion (13) yields the following set of free surface wave equations when no body forces are present:

$$\partial_{11} v_1 = \beta^2 (\nabla^2 v_1) + 2\left(\beta^2 - \frac{\beta^4}{\alpha^2}\right) \partial_1 (\nabla_H \cdot v_H) \quad (16)$$

$$\partial_{11} v_2 = \beta^2 (\nabla^2 v_2) + 2\left(\beta^2 - \frac{\beta^4}{\alpha^2}\right) \partial_2 (\nabla_H \cdot v_H) \quad (17)$$

$$\partial_{11} v_3 = \alpha^2 (\partial_{33} v_3) - (\alpha^2 - 2\beta^2)(\nabla_H^2 v_3) \quad (18)$$

where the vertical derivatives are taken downwards. As used herein, repeated subscripts on the derivative operator $\partial$ denote multiple derivatives (e.g., $\partial_{33} = \partial_3 \partial_3$). The final term on the right hand side of each of equations (16)–(18) contains only horizontal derivatives. The only depth derivatives in these equations are contained in the first term on the right of each equation, and these terms only involve the pure second order depth derivatives $\partial_{33} v$. Hence, these equations form three constraints that can be inverted directly for material parameters $\alpha$ and $\beta$, and no mixed derivatives in depth are required. The latter point is important since it suggests that we can measure all relevant derivatives using only a single buried geophone (e.g., using the geometries in FIGS. 2(c) and 2(d)) using the techniques described in further detail below.

If the receiver geometry used does not allow derivatives to be centered at identical locations, material properties obtained by inserting derivative estimates into either form of the wave equation (1) or equations (16) to (18) will be inaccurate. In surface seismics this principally affects estimates of derivatives with respect to depth; logistically it is usually easy to center all horizontal derivatives at a single location on the surface, but the same centering is impossible to achieve directly for vertical derivative measurements.

Figure 4A:
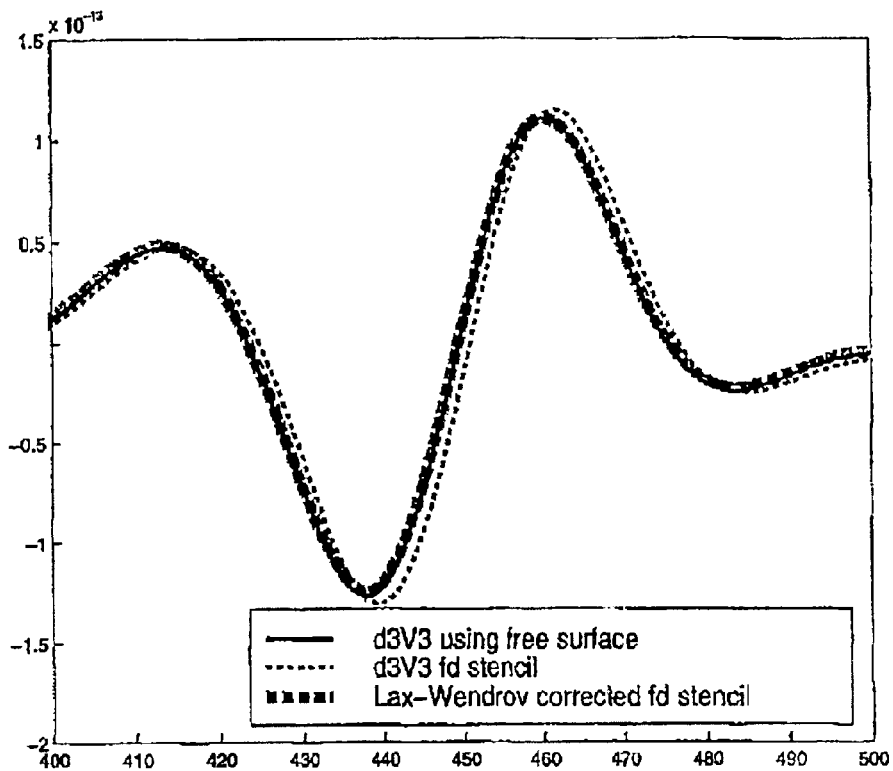
FIGS. 4a–b illustrates the effect that mis-centering has on vertical derivative estimates.
Figure 4B:
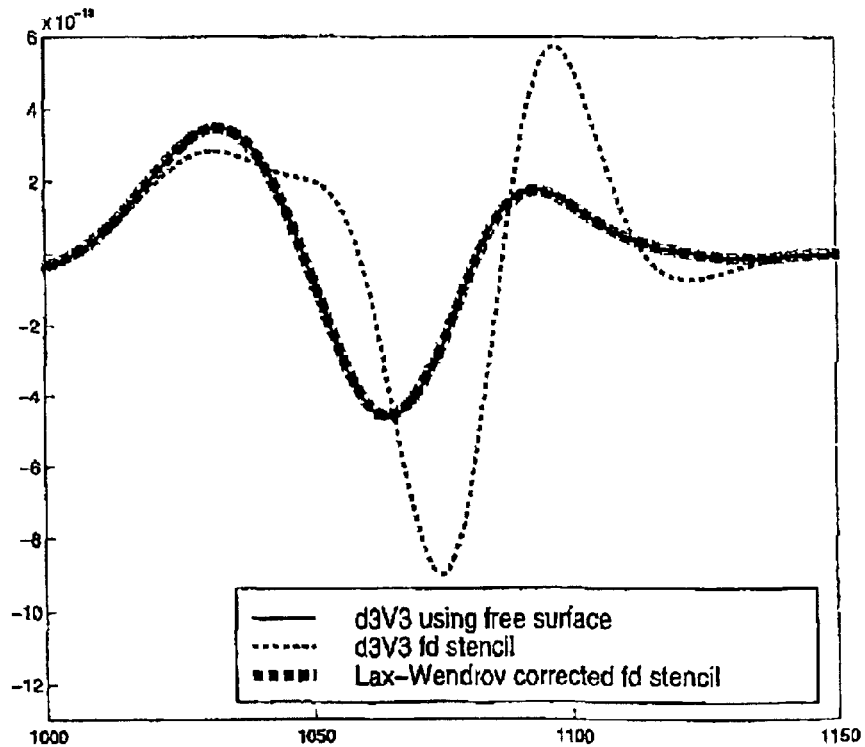

FIGS. 4a and 4b illustrate the effect that mis-centering has on vertical derivative estimates. From FIGS. 4a and 4b, it can be seen that for conventional seismic frequencies and typical near surface velocities, differences in centering of only 12.5 cm can cause large deviations in the estimates obtained. The first order vertical derivative estimated using the free surface condition is calculated directly from the horizontal derivative estimates using equation (9), and hence is centered exactly on the free surface. The vertical derivative estimated explicitly using f-d stencils centered only 12.5 cm below the surface is shown to provide very poor approximations to the surface value in the example given (this is the case in many realistic examples tested). Hence, often it will be necessary to correct the derivative centering before wave equation inversion can be applied.

FIGS. 4a and 4b estimate of $\partial_3 v_3$ for a synthetic P wave arrival (FIG. 4a) and surface wave arrival (FIG. 4b) using the experiment geometry in FIG. 1 with a receiver array similar to that in FIG. 2(d), but with receivers spaced 25 cm apart. In each case, the solid curve is the derivative calculated using the free surface condition in equation (9) and hence is centered on the free surface. The thin dashed curve is $\partial'_3 v_3$ defined by equation (53), below, using a first-order fd stencil in depth, and hence is centered 12.5 cm below the ground surface. The thick dashed curve is derivative $\partial'_3 v_3$ re-centered to the free surface using the Lax-Wendroff correction in equations (23) and (24), and almost entirely overlays the black curve. The horizontal axis is time in milliseconds (ms), the vertical axis is the derivative value in 1/ms.

At any point $x_0$ on the Earth's surface a Taylor expansion of velocity v can be used to write $$v(x_0 + \Delta x_3) = v(x_0) + \Delta x_3 \; \partial_3 v(x_0) + \frac{\Delta x_3^2}{2} \partial_{33} v(x_0) + O(\Delta x_3^3) \quad (19)$$

where $\Delta x_3 = [0,0,\Delta x_3]^T$ for any small depth increment $\Delta x_3$. Hereinafter, the order of the derivative being estimated will be referred to as usual by first order, second order, etc., and the accuracy of the Taylor approximation used for the estimates will be referred to as $O(\Delta x_3^2)$, $O(\Delta x_3^3)$, etc. Rearranging this equation gives, $$\partial_3 v(x_0) = \left[\frac{v(x_0 + \Delta x_3) - v(x_0)}{\Delta x_3}\right] - \frac{\Delta x_3}{2} \partial_{33} v(x_0) + O(\Delta x_3^2) \quad (20)$$

Hence, if $\partial_{33} v(x_0)$ can be estimated then the conventional $O(\Delta x_3)$ fd stencil for $\partial_3 v(x_0 + \Delta x_3/2)$ in equation (20) (the square-bracketed term, right hand side) can be modified to give $\partial_3 v(x_0)$ up to $O(\Delta x_3)$. The correction term (second term, right hand side) consists of a linear (in $\Delta x_3$) approximation to the error introduced by mis-centering the derivative estimates using the conventional stencil.

Derivatives $\partial_{33} v(x_0)$ can be related to horizontal and temporal derivatives using the wave equation. Since we wish to use these derivatives in a correction centered at the ground surface we will use the free surface wave equations (16) to (18) to obtain $O(\Delta x_3)$ corrections, $L_1$ say, defined to be equal to the second term on the right side of equation (20). These are obtained simply by rearranging equations (16) to (18):

$$\partial_{33} v_1 = \frac{\partial_{11} v_1}{\beta^2} - (\nabla_H^2 v_1) - 2\left(1 - \frac{\beta^2}{\alpha^2}\right) \partial_1 (\nabla_H \cdot v_H) \quad (21)$$

$$\partial_{33} v_2 = \frac{\partial_{11} v_2}{\beta^2} - (\nabla_H^2 v_2) - 2\left(1 - \frac{\beta^2}{\alpha^2}\right) \partial_2 (\nabla_H \cdot v_H) \quad (22)$$

$$\partial_{33} v_3 = \frac{\partial_{11} v_3}{\alpha^2} + \left(1 - 2\frac{\beta^2}{\alpha^2}\right) \nabla_H^2 v_3 \quad (23)$$

$$L_1 = -\frac{\Delta x_3}{2} \partial_{33} v \quad (24)$$

In modelling wave propagation using finite difference techniques, according to the invention, the preferred method of computing this type of correction term using the wave equation to calculate any derivatives that can not be measured is known as Lax-Wendroff correction. For further detail on this method refer to: P. D. Lax and B. Wendroff, Difference schemes for hyperbolic equations with high order of accuracy. Comm. Pure appl. Math., 27, 1964, incorporated herein by reference. See also, J. O. Blanch and J. O. A. Robertsson, A modified Lax-Wendroff correction for wave propagation in media described by Zener elements. Geophys. J. Int., 131:381–386, 1997, also incorporated herein by reference.

Using the Lax-Wendroff correction for correcting measured data advantageously provides increased accuracy in vertical wavefield derivatives centered exactly on the free surface of the earth.

FIGS. 4a and 4b show examples of the Lax-Wendroff correction $L_1$ applied to first order derivative estimates of $\partial_3 v_3$ using fd stencils centered 12.5 cm below the surface. The corrected derivative estimate is virtually identical to that obtained exactly on the free surface (using the free surface conditions). Hence, as long as the second order horizontal and temporal derivatives in equations (21) to (23) can be estimated with sufficient accuracy, all first order derivatives can be estimated to $O(\Delta x_3^2)$ exactly at the free surface.

Figure 5:
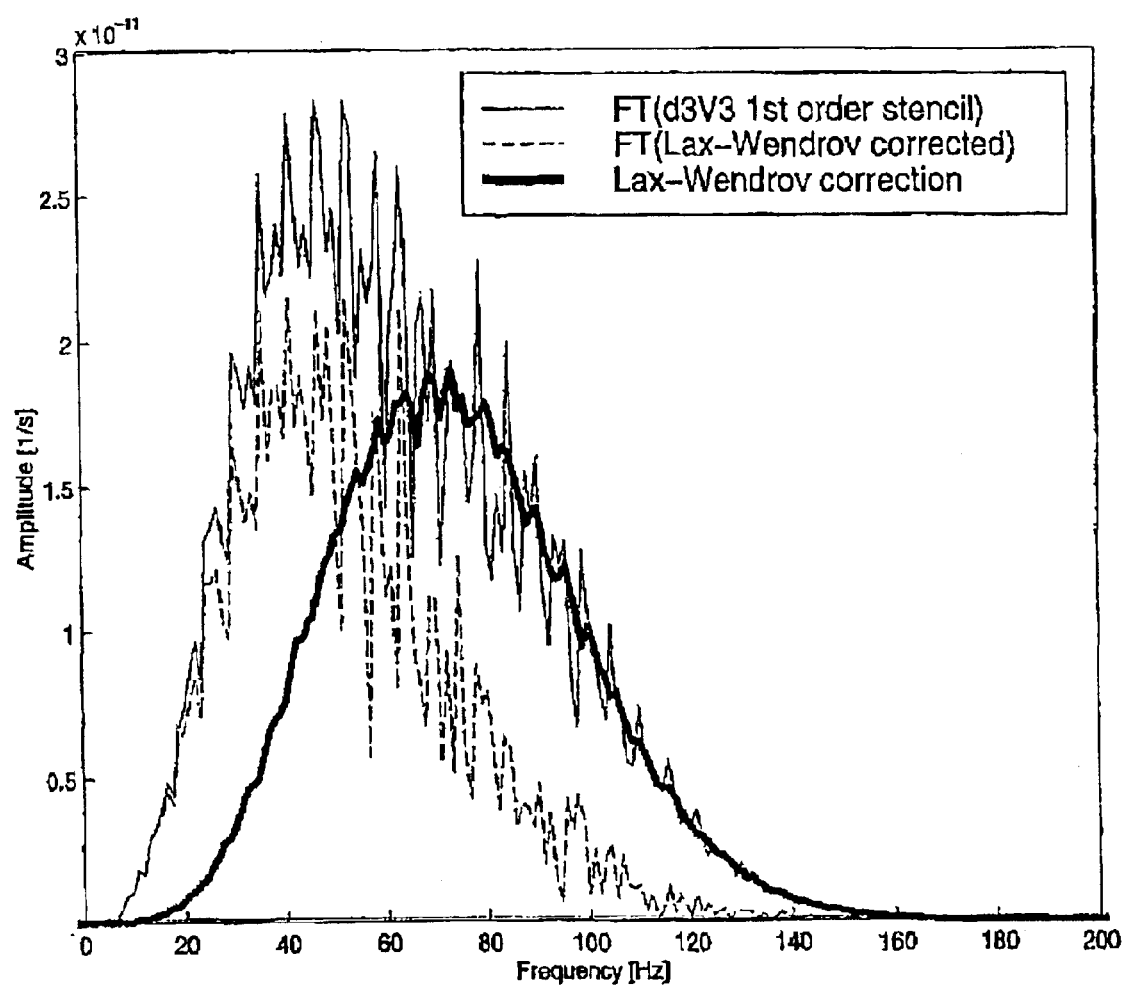
FIG. 5 illustrates the frequency dependency of the contribution of the Lax-Wendroff correction, according to a preferred embodiment of the invention.

FIG. 5 shows that the contribution of the Lax-Wendroff correction for $\partial_3 v_3$ is highly frequency-dependent. In particular, it does not have a maximum amplitude at the same frequency as the maximum of the signal itself. This is because $L_1$ contains second derivatives in both space and time (the second order time derivative is equivalent to multiplication by $-\omega^2$ in the frequency domain).

Similarly to the case just described, the second order derivative estimates obtained using equation (54) (set out below), are centered at a depth $\Delta x_3/4$ below the surface. Estimates centered at the surface can be obtained by expanding the Taylor series in equation (20) to one additional term. Rearranging the terms yields:

$$\partial_{33} v(x_0) = \left[\frac{v(x_0 + \Delta x_3) - v(x_0)}{\Delta x_3} - \partial_3 v(x_0)\right] \frac{2}{\Delta x_3} - \frac{\Delta x_3}{3} \partial_{333} v(x_0) + O(\Delta x_3^2) \quad (25)$$

Hence, the $O(\Delta x_3)$ Lax-Wendroff correction $L_2$ for second order derivatives is given by $$L_2 = -\frac{\Delta x_3}{3} \partial_{333} v \quad (26)$$

The first term on the right hand side of equation (25) is the approximation to $\partial_{33} v(x_0 + \Delta x_3/4)$ given by equation (54). Equation (26) provides a linear (in $\Delta x_3$) correction that shifts the derivative centering to $x_0$. The third order derivatives with depth can be obtained by differentiating the wave equation (1) once with respect to $x_3$, and again applying the free surface condition to simplify mixed derivatives in depth. Notice that we can not achieve this by differentiating expressions (21) to (23) with respect to depth since these expressions are only valid exactly on the free surface. The third order vertical derivatives at the free surface can be written:

$$\partial_{333} v_1 = \left(\frac{\beta^2 - 2\alpha^2}{\alpha^2 \beta^2}\right) \partial_{11}(\partial_1 v_3) + \left(\frac{3\alpha^2 - 2\beta^2}{\alpha^2}\right) \partial_1 (\nabla_H^2 v_3) \tag{27}$$

$$\partial_{333} v_2 = \left(\frac{\beta^2 - 2\alpha^2}{\alpha^2 \beta^2}\right) \partial_{11}(\partial_2 v_3) + \left(\frac{3\alpha^2 - 2\beta^2}{\alpha^2}\right) \partial_2 (\nabla_H^2 v_3) \tag{28}$$

$$\partial_{333} v_3 = \left(\frac{2\alpha^2 \beta^2 - \alpha^4 - 2\beta^4}{\alpha^4 \beta^2}\right) \partial_{11}(\nabla_H \cdot v_H) + \left(\frac{3\alpha^4 + 4\beta^4 - 6\alpha^2 \beta^2}{\alpha^4}\right) \nabla_H^2 (\nabla_H \cdot v_H) \tag{29}$$

Hence we have expressed third order vertical derivatives in terms of second order time derivatives of first order horizontal derivatives (first terms on right of each equation) and third order horizontal derivatives (second term on right hand sides). These can be substituted into equation (26) to obtain the required Lax-Wendroff correction.

It is believed that the information on isotropic P and S velocities gained using this preferred technique described herein is the maximum possible such information from any waveform inversion technique. This is because the derivative data (plus isotropic assumption) includes sufficient information to determine completely the local wavefield within the recorded bandwidth. Hence, there exists no other information about the wavefield that could possibly be used to improve constraints on the P and S velocities.

It is possible to derive a set of linear constraints on the P and S velocities that involve only first order spatial wavefield derivatives. We do so by calculating the vertical derivatives of the wavefield both using, and without using the free surface condition in equation (9). In each of these cases we obtain respectively:

$$(\partial_3 v_3)_{fs} = -\left(\frac{\beta}{\alpha}\right)^2 (\partial_1 v_1 + \partial_2 v_2) \tag{33}$$

$$(\partial_3 v_3)_{fd} = \frac{v_3^{\Delta} - v_3}{\Delta x_3} + L_{1,3} \tag{34}$$

where fs and fd refer to "free surface" and "finite difference" respectively, and $v_3^{\Delta}$ is the $x_3$ component of velocity at distance $\Delta x_3$ below the point at which $v_3$ is recorded. Equation (33) is really a definition of $(\partial_3 v_3)$ fs using equation (9), and equation (34) is a finite difference approximation to the vertical derivative $\partial_3 v_3$. Notice that in equation (34), the third component of the correction $L_1$ has been applied to ensure that the derivative estimates are both centered at exactly the same location.

If estimates of the derivatives on the right hand sides of equations (33) and (34) are made using fd stencils that are centered at approximately the same location, then two estimates of the same quantity are obtained, one of which uses an explicit depth derivative, one of which does not. Hence, $$(\partial_3 v_3)_{fs} = (\partial_3 v_3)_{fd} \tag{35}$$

provides a set of constraints on $\alpha$ and $\beta$. Expanding equation (35) gives:

$$2\frac{\beta^2}{\alpha^2}(\partial_1 v_1 + \partial_2 v_2) = \partial_1 v_1 + \partial_2 v_2 + \left[\frac{v_3(dx_3) - v_3(0)}{dx_3}\right] - \frac{dx_3}{2}\left[\frac{\partial_{11} v_3}{\alpha^2} + \left(1 - 2\frac{\beta^2}{\alpha^2}\right)(\partial_{11} v_3 + \partial_{22} v_3)\right] \tag{36}$$

$$\Rightarrow \frac{dx_3}{2}\partial_{11} v_3 = \alpha^2[(\nabla_H \cdot v_H) + \partial_3' v_3] - \beta^2[2(\nabla_H \cdot v_H) - dx_3(\nabla_H^2 v_3)] \tag{37}$$

where $\partial'_3 v_3$ is given by equation (53). This shows that a set of linear equations is obtained relating $\beta^2$ and $\alpha^2$, one equation for each point in time. These can be solved numerically.

It will now be shown how equation (1), equations (16)–(18) or equation (35) can be inverted to constrain P and S velocities, $\alpha$ and $\beta$ respectively, given the derivative estimates. Equations (1) and (35) each result in a set of linear equations in $\alpha^2$ and $\beta^2$. These systems can be solved very simply using standard techniques (e.g., W. Menke, *Geophysical data analysis: Discrete inverse theory (Revised edition)*, volume 45 of *International Geophysics Series*. Academic Press Inc., Harcourt Brace Jovanovich, 1989; F. Press, B. P. Flannery, S. A. Teukolsky, and W. T. Vetterling. *Numerical Recipies in FORTRAN, the art of scientific computing (2nd edition)*. Cambridge University Press, 1992; and R. L. Parker. *Geophysical inverse theory*. Princeton University Press, 1994.) However, in order to illustrate the solution uncertainty graphically we will construct and display misfit functions in the time domain:

$$E_N = \log\left\{\frac{[L^N - R^N]^T [L^N - R^N]}{(\sigma^N)^2}\right\}. \tag{38}$$

Here $L^N$ and $R^N$ refer respectively to the left- and right-hand sides of equation number (N). These are vectors consisting of samples in time or frequency where the signals may have been filtered in time to extract any desired wavefield arrival, and filtered in frequency to extract any desired frequency component. The derivative estimates in each equation (N) are assumed to have been centered at identical locations. The factor $(\sigma^N)^2$ represents the scalar variance of elements of $L^N$, and its reciprocal is a suitable weighting factor so that contributions from signals with large amplitudes do not dominate E.

Given sufficiently accurate derivative data, we can estimate parameters $\alpha$ and $\beta$ by minimising any of $E_{(1)}$, $E_{(16)}$, $E_{(17)}$, $E_{(18)}$, or $E_{(35)}$, or a combination of all of these. Thus we ensure that any of equations (1), (16)–(18) and (35) are satisfied as accurately as possible.

First we construct a frequency domain misfit function based on the requirement that divergences satisfy equation (35):

$$E_{(35)} = \log\left\{\frac{[|L^{(35)}| - |R^{(35)}|]^T [|L^{(35)}| - |R^{(35)}|]}{(\sigma^{(35)})^2}\right\}. \tag{39}$$

Here the modulus signs imply that only the Fourier domain amplitudes (within the signal frequency band) of left and right hand sides of equation (35) are compared. This removes problems associated with points in time where either $(\nabla \cdot v)_{fs}$ or $(\nabla \cdot v)_{fd}$ in equation (35) become numerically equivalent to zero.

Figure 6:
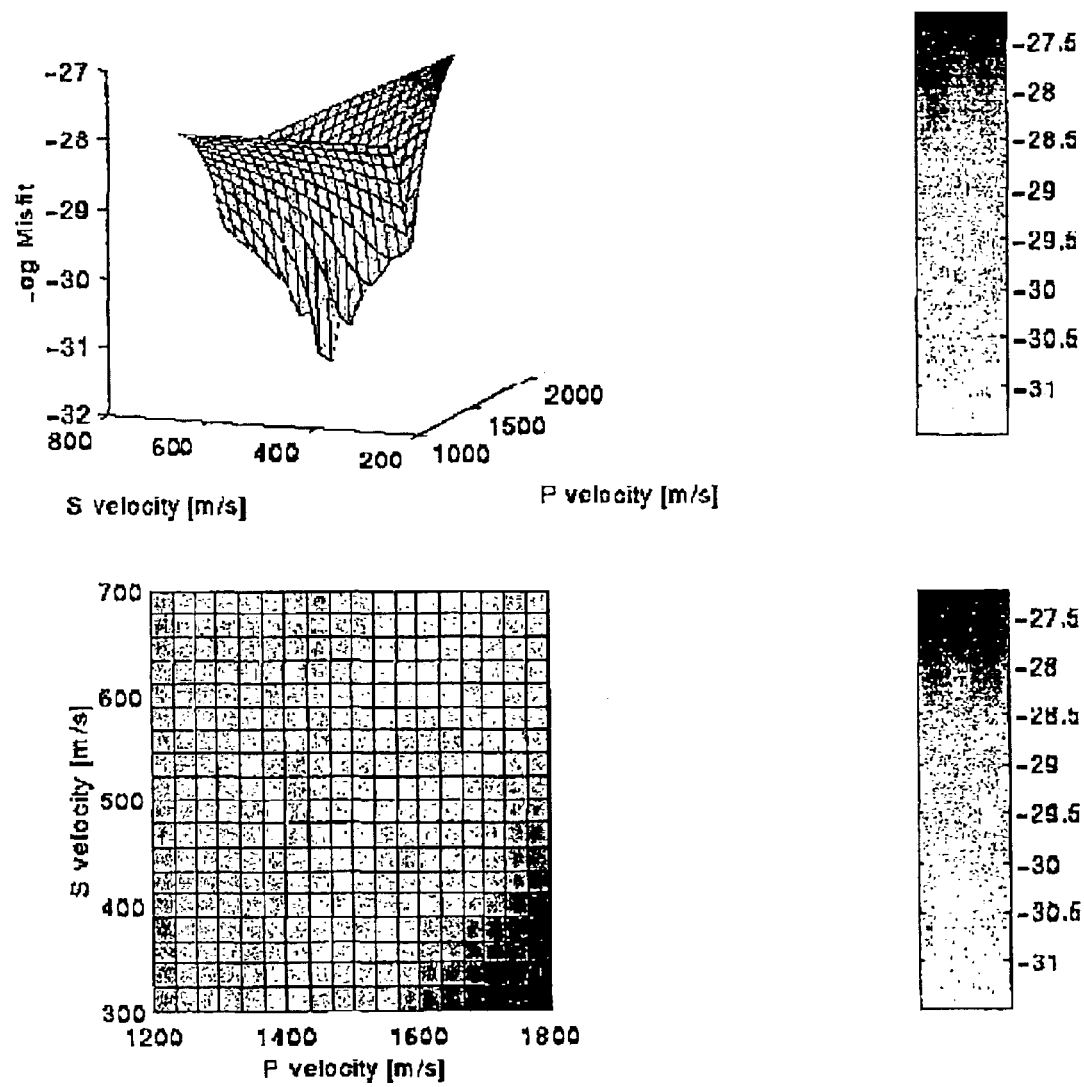
FIG. 6 shows the misfit function $E_{(35)}$ for the medium and complete time series data of which snapshots are illustrated in FIGS. 4a and 4b, according to the invention.

FIG. 6 shows the misfit function $E_{(35)}$ for the medium and complete time series data of which snapshots are illustrated in FIGS. 4a and 4b. It is immediately apparent that the misfit function has a well defined minimum at the correct solution ($\alpha^r$=1500 m/s, $\beta^r$=500 m/s). Hence, if sufficiently accurate data are available, the constraints offered by equation (35) (at each point in time) are sufficient to estimate both P and S velocities.

The accuracy of such estimates will decrease with decreasing time series length or frequency content. Even using the complete modelled time series in this case there exists a linear trade-off that degrades the estimate of $\beta$ more than that of $\alpha$. However, noting that the colour scale is logarithmic, the minimum in this surface still gives at least a factor of ten better fit to the data than $\alpha_r \pm 2\%$ or $\beta_r \pm 7\%$. Hence, since time series from many sources can be inverted for the same P and S velocities, the estimate accuracy should be sufficient for most requirements.

The preferred technique for estimating 1st and 2nd order spatial wavefield derivatives will now be discussed in further detail. Using either of the receiver geometries in FIGS. 2(c) or 2(d) it is possible to estimate all first and second order derivatives in the wavefield. Using receiver geometry d for instance, we may estimate horizontal derivatives centred at the free surface above the central point using the finite difference formulae:

$$\partial_1 v = \frac{1}{2}\left[\frac{(v^{(2)} - 27v^{(6)} - 27v^{(10)} - v^{(14)})}{24\Delta_{x_1}} + \frac{(v^{(3)} - 27v^{(7)} - 27v^{(11)} - v^{(15)})}{24\Delta_{x_1}}\right] + O(\Delta x_1^4) \quad (40)$$

$\partial_2 v$ obtained by rotation of the above (41)

$\partial_3 v$ { obtained from $\partial_1 v$ and $\partial_2 v$ using the free surface condition (e.g., equations (9) – (11)) (42)

$$\partial_{11} v = \frac{1}{2}\left[\frac{v^{(2)} - v^{(6)} - v^{(10)} + v^{(14)}}{2\Delta x_1^2} + \frac{v^{(3)} - v^{(7)} - v^{(11)} + v^{(15)}}{2\Delta x_1^2}\right] + O(\Delta x_1^2) \quad (43)$$

$\partial_{22} v$ obtained by rotation of the above (44)

$$\partial_{12} v = \left[\frac{v^{(11)} - v^{(10)}}{\Delta x_2} - \frac{v^{(7)} - v^{(6)}}{\Delta x_2}\right]\frac{1}{\Delta x_1} + O(\Delta x_1^2, \Delta x_2^2) \quad (45)$$

where bracketed superscripts denote the receiver number in FIG. 2(d). Second mixed derivatives in the vertical direction can be obtained by using the free surface condition:

$\partial_{13} v_1 = -\partial_{11} v_3$ (46)

$\partial_{23} v_1 = -\partial_{12} v_3$ (47)

$\partial_{13} v_2 = -\partial_{12} v_3$ (48)

$\partial_{23} v_2 = -\partial_{22} v_3$ (49)

$$\partial_{13} v_3 = -\partial_1 (\nabla_H \cdot v_H)\frac{\lambda}{\lambda + 2\mu} \quad (50)$$

$$\partial_{23} v_3 = -\partial_2 (\nabla_H \cdot v_H)\frac{\lambda}{\lambda + 2\mu} \quad (51)$$

All first and second order derivatives above can be estimated using only receivers on the surface. Finally, however, second order pure derivatives in depth must be obtained using both the free surface condition and receiver 17 at depth as follows.

Define the velocity $v^s$ to be that estimated at the free surface directly above receiver 17, $$v^3 = \frac{v^{(6)} + v^{(7)} + v^{(10)} + v^{(11)}}{4}. \quad (52)$$

The finite-difference first order derivatives in depth (denoted $\partial'_3$) are centred vertically above receiver 17 half way to the surface:

$$\partial'_3 v = [v^{(17)} - v^3]\frac{1}{\Delta x_3} + O(\Delta x_3^2) \quad (53)$$

In addition, equation (42) estimates the same derivative at the surface. Hence, the difference between these two estimates can be used to obtain the second order depth derivatives centred at depth $dx_3/4$:

$$\partial_{33} v = 2\frac{\partial'_3 v - \partial_3 v}{\Delta x_3} \quad (54)$$

Thus, we may estimate all first and second order derivatives of the wavefield using the receiver geometry in FIG. 2(b). For any other surface geometry (e.g., the minimal 5-star spread in FIG. 2(c)), only the horizontal spatial derivative finite difference estimations (40) to (45) and the surface velocity estimate for $v^s$ in equation (52) change, whereas equations (46) to (51) and (53) to (54) remain the same.

According to another embodiment of the invention, another method is provided in which spatial and temporal derivatives of the wavefield can be used to estimate near-surface material properties. This method is also particularly applicable where dense recordings of the wavefield are available to allow spatial derivatives to be calculated and the wave types present in a specific temporal window to be known. Additionally, this method advantageously can be applied to data from surveys having the entire receiver group on the ground surface, i.e. where there is no buried receivers in the receiver group.

According to this embodiment, the interaction of the wavefield with the free surface can easily be expressed in a potential formulation. According to this embodiment, it is assumed that the selected temporal window contains one up-going plane P-wave and the positive z-direction is chosen to be downwards. The incoming P-wave generates both a reflected P- and a converted SV-wave at the surface, with corresponding scalar potentials:

$$\Phi_{inc} = A \exp\left[i\omega\left(\frac{\sin i}{\alpha}x - \frac{\cos i}{\alpha}z - t\right)\right] \quad (55)$$

$$\Phi_{refl} = B \exp\left[i\omega\left(\frac{\sin i}{\alpha}x + \frac{\cos i}{\alpha}z - t\right)\right] \quad (56)$$

$$\Psi_{refl} = C \exp\left[i\omega\left(\frac{\sin j}{\beta}x + \frac{\cos j}{\beta}z - t\right)\right], \quad (57)$$

where $\alpha$ and $\beta$ are the P- and S-velocity respectively, i is the angle of incidence of the incoming P-wave and j the angle of reflection for the converted S-wave. The corresponding expressions for the particle velocities can be obtained from equations (55–56) through:

$$u_x = \frac{\partial \Phi_{inc}}{\partial x} + \frac{\partial \Phi_{refl}}{\partial x} - \frac{\partial \Psi_{refl}}{\partial z} \quad (58)$$

$$u_z = \frac{\partial \Phi_{inc}}{\partial z} + \frac{\partial \Phi_{refl}}{\partial z} + \frac{\partial \Psi_{refl}}{\partial x} \quad (59)$$

If ratios between $u_x$ and $u_z$ or derivatives of these are calculated the exponential expressions will vanish for recordings at the free surface, where $z \approx 0$. This yields:

$$\frac{u_x}{u_z} = \frac{(1+V_{PP})\sin i - \sqrt{\gamma^2 - \sin^2 i} \; V_{PS}}{(V_{PP}-1)\cos i + \sin i V_{PS}} \quad (60)$$

$$\frac{\partial u_z/\partial x}{\partial u_x/\partial t} = \frac{\cos i \; \sin i (1-V_{PP}) - \sin^2 i \; V_{PS}}{\alpha \left(\sin i (1+V_{PP}) - \sqrt{\gamma^2 - \sin^2 i} \; V_{PS}\right)} \quad (61)$$

$$\frac{\partial u_{x,z}/\partial x}{\partial u_{x,z}/\partial t} = -\frac{\sin i}{\alpha}, \quad (62)$$

where $\gamma = \alpha/\beta$ and $V_{pp}$ and $V_{PS}$ are the reflection and conversion coefficients for the potentials at the free surface. Equations (60), (61) and (62) are three linear independent equations for non-vertical incident waves and thus can be used to solve for the three unknowns $i$, $\alpha$ and $\gamma$ (and hence $\beta$) in a minimization scheme. Note that equations (61) and (62) should be normalized with slowness.

No vertical derivatives are required so far, but if such information is available, similar equations can be derived for the corresponding combinations of vertical and temporal derivatives. In addition to this, expressions can also be obtained for an incoming S-wave, and these two options enable us to improve the performance of the method, since the method is likely to be more robust when larger parts of the data set can be used as input. In order to find more suitable events a measure for data-quality is required. A potential strategy is to use equation (63) and define an energy function as:

$$E = \left[\left(\frac{\partial u_x}{\partial x}\frac{\partial u_z}{\partial t}\right) - \left(\frac{\partial u_z}{\partial x}\frac{\partial u_x}{\partial t}\right)\right]^2 \quad (63)$$

Once suitable events have been determined, the inversion can be carried out over all these windows. The unknowns $\alpha$ and $\gamma$ should be equal for all intervals, whereas the angle of incidence is different for each event:

$$E_{|D|}(\alpha, \gamma, i_1 \ldots N) = \sum_{k=1}^{N} E_k(\alpha, \gamma, i_k), \quad (64)$$

where N is the total number of selected suitable windows and the $E_k$ are the energy functions using the $k_{th}$ interval. These are given by the squared differences of the left hand and right hand side expressions in equations (60–62) in case a time window is used with one incoming P-wave.

Figure 7:
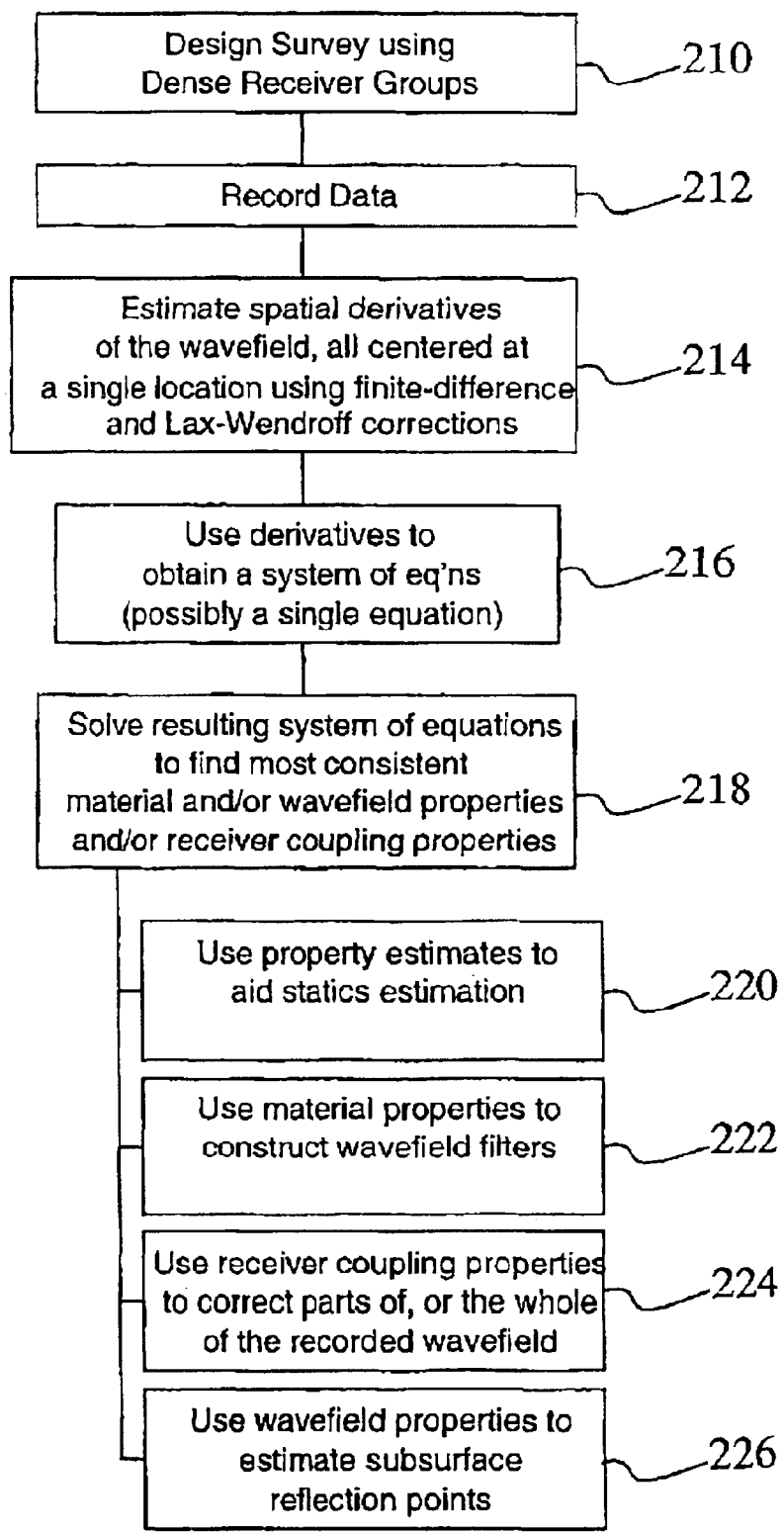
FIG. 7 is a flow chart showing the steps of estimating material properties according to preferred embodiments of the invention.

FIG. 7 is a flow chart showing the steps of estimating material properties according to preferred embodiments of the invention. In step 210, the seismic survey is designed using dense receiver groups as described and shown herein. In step 212, the seismic data are recorded. In step 214 the spatial derivatives of the wavefield are estimated, preferably all centered at a single location using finite-difference and where desirable, the Lax-Wendroff corrections. In step 216 the derivatives are used to obtain a system of equations, or possibly a single equation. In step 218 the results of the system equations are solved to find the most consistent material and/or wavefield properties and/or receiver coupling properties.

Steps 220, 222, 224, and 226 show examples of possible uses of the results of step 218. In step 220, the property estimates are used to aid statics estimation. In step 222 the material properties are used to construct wavefield filters. In step 224 the receiver coupling properties are used to correct parts of, or the whole of the recorded wavefield. In step 226 the wavefield properties are used to estimate subsurface reflection points.

Figure 8:
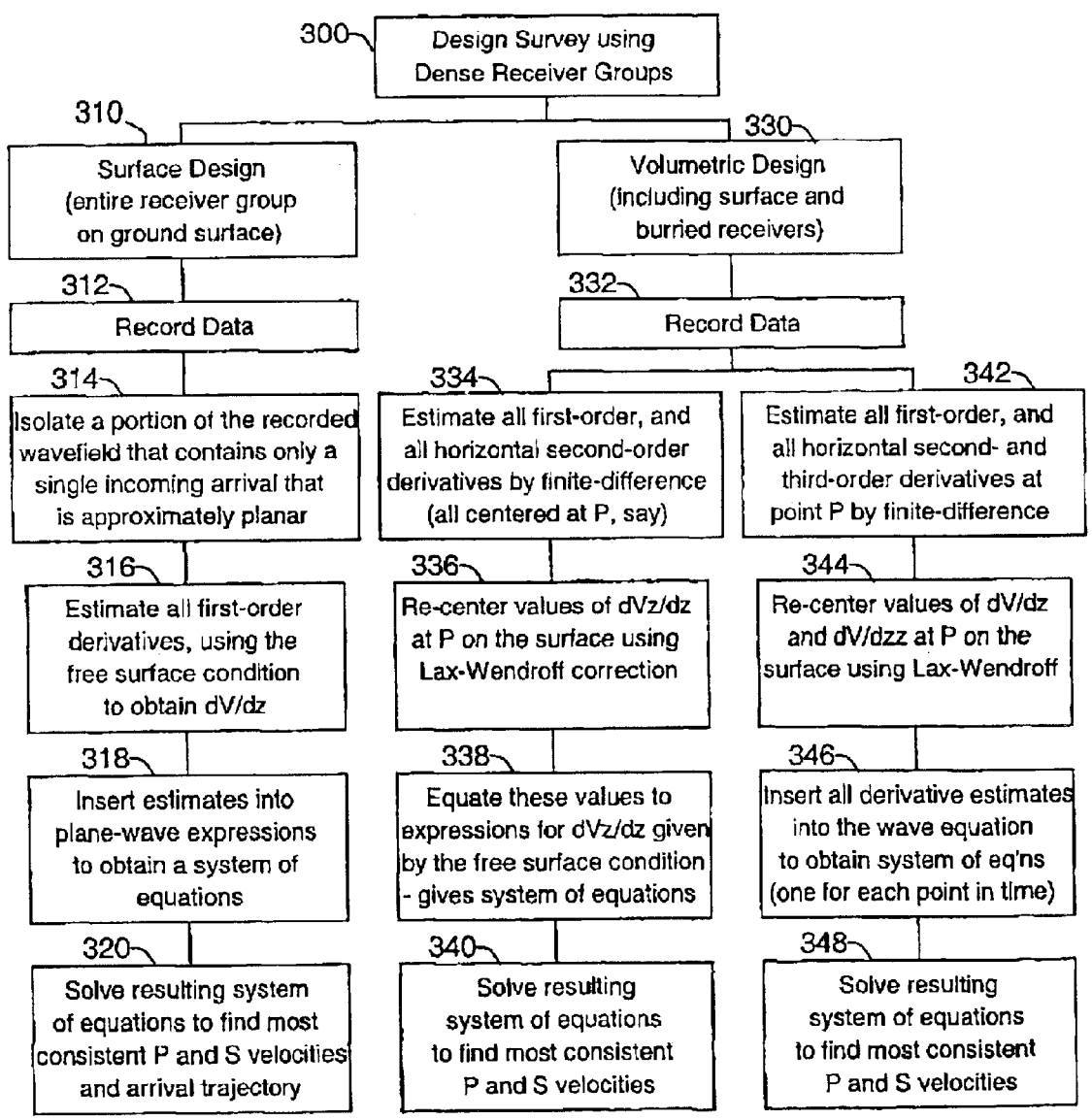
FIG. 8 is a flow chart showing further detail of the preferred methods for estimating material properties, according to preferred embodiments of the invention.

FIG. 8 is a flow chart showing further detail of the preferred methods for estimating material properties, according to preferred embodiments of the invention. In step 300 the seismic survey is designed using dense receiver groups. The survey is designed as either a surface design, step 310, or as a volumetric design, step 330. In step 310, the entire receiver group is on the ground (or sea floor) surface. In step 312, the seismic data are recorded. In step 314 the portion of the recorded wavefield that contains only a single in-coming arrival that is approximately planar is isolated. In step 316 the first order derivatives are estimated using the free surface condition to obtain dV/dz. In step 318 the estimates are inserted into plane-wave expressions to obtain a system of equations. In step 320 the resulting system of equations are solved to find the most consistent P and S velocities and arrival trajectory.

In the case of volumetric seismic survey design, step 330, the receiver group includes at least one receiver buried beneath the ground surface. In step 332 the data is recorded. Steps 342, 344, 346, and 348 depict the embodiment involving full wave equation inversion. In step 342, all first order, and all horizontal second and third order derivatives are estimated at a point P by finite difference. In step 344 the values of dV/dz and dV/dzz are re-centered at point P on the surface using the Lax-Wendroff correction. In step 346 all derivative estimates are inserted into the wave equation to obtain a system of equations, one for each point in time. In step 348, the resulting system of equations are solved to find the most consistent P and S velocities.

Steps 334, 336, 338, and 340 depict the embodiment involving vertical derivative inversion. In step 334 all first order and all horizontal second order derivatives are estimated by finite difference. In step 336, the values of dVz/dz are re-centered at point P on the surface using the Lax-Wendroff correction. In step 338 the values are equated to expressions for dVz/dz given by the free surface condition, giving a system of equations. In step 340 the resulting system of equations are solved to find the most consistent P and S velocities.

While preferred embodiments of the invention have been described, the descriptions are merely illustrative and are not intended to limit the present invention. For example, while the preferred embodiments of the invention have been described primarily for use on the land surface, the invention is also applicable to receivers placed on and below the ocean floor. In the case of ocean bottom receivers, it is preferable to use stress conditions relevant for fluid-solid boundaries rather than the free surface condition. Additionally, the present invention is applicable to seismic measurements made in a borehole, known as borehole seismics. Although the examples described assume an essentially isotropic medium in the near surface region, the invention is also applicable to anisotropic media. In the case of anisotropic media, one may wish to increase the number geophones per group.

What is claimed is:

1. A method of estimating near-surface material properties in the vicinity of a locally dense group of seismic receivers comprising the steps of:
   receiving data measured by the locally dense group of seismic receivers, the data representing earth motion caused by a seismic wavefield;
   estimating local derivatives of the wavefield such that the derivatives are centered at a single location in the vicinity of the receiver group; and
   using physical relationships between the estimated derivatives to estimate near-surface material properties in the vicinity of the receiver group.

2. The method of claim 1 wherein the step of estimating the local derivatives includes centering the derivatives using a technique substantially similar to the Lax-Wendroff correction.

3. The method of claim 1 wherein the physical relationships used to estimate material properties include the free surface condition.

4. The method of claim 1 wherein the physical relationships used to estimate material properties include wave equations.

5. The method of claim 1 wherein at least one of the receivers in the receiver group is buried below the earth surface such that the receiver group encloses a volume.

6. The method of claim 1 wherein the receivers in the locally dense group are spaced around 1 meter or less from each other.

7. The method of claim 6 wherein the receivers in the group are spaced around 0.5 meters or less from each other.

8. The method of claim 7 wherein the receivers in the group are spaced around 0.25 meters or less form each other.

9. The method of claim 1 wherein the receivers in the group are spaced apart by a distance approximately equal to or less than one-fifth of the shortest wavelength of interest.

10. The method of claim 1 wherein the material properties estimated include those experienced by the incoming wavefield that are frequency and wave type dependent.

11. The method of claim 1 wherein the receivers are located at or near the sea bottom, and wherein the physical relationships used to estimate material properties include fluid-solid boundary conditions.

12. The method of claim 1 wherein the receivers are located in a borehole.

13. The method of claim 1 wherein the physical relationships used to estimate material properties are derived from the physics of plane waves arriving at the receiver group.

14. The method of claim 13 wherein the group of receivers does not include any buried receivers.

15. An apparatus for estimating near-surface material properties in the vicinity of a locally dense group of seismic receivers comprising:
   a storage configured to store data measured by the locally dense group of seismic receivers, the stored data representing earth motion caused by a seismic wavefield;
   a derivative estimator adapted to process the stored data and estimate local derivatives of the wavefield such that the derivatives are centered at a single location in the vicinity of the receiver group; and
   a material property estimator adapted to estimate physical relationships between the estimated derivatives to estimate near-surface material properties in the vicinity of the receiver group.

16. The apparatus of claim 15 wherein the derivative estimator centers the derivatives using a technique substantially similar to the Lax-Wendroff correction, and the physical relationships used to estimate material properties include the free surface condition.

17. The apparatus of claim 16 wherein the receivers in the locally dense group are spaced around 1 meter or less from each other.

18. The apparatus of claim 15 wherein the receivers are located at or near the sea bottom, and wherein the physical relationships used to estimate material properties include fluid-solid boundary conditions.

19. The apparatus of claim 15 wherein the physical relationships used to estimate material properties are derived from the physics of plane waves arriving at the receiver group.

* * * * *